Nov. 23, 1937.                P. PIRSCH                 2,099,905
TILLERMAN'S WINDSHIELD FOR LADDER TRUCK TRAILERS
Filed June 10, 1936            2 Sheets-Sheet 1
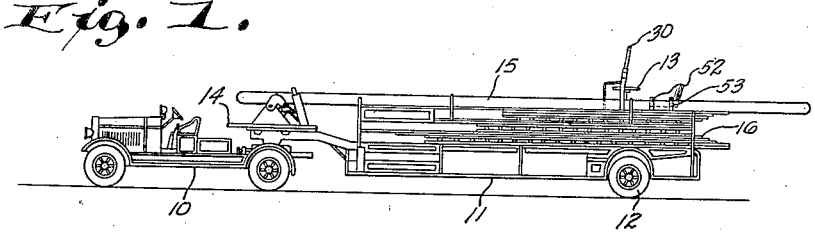
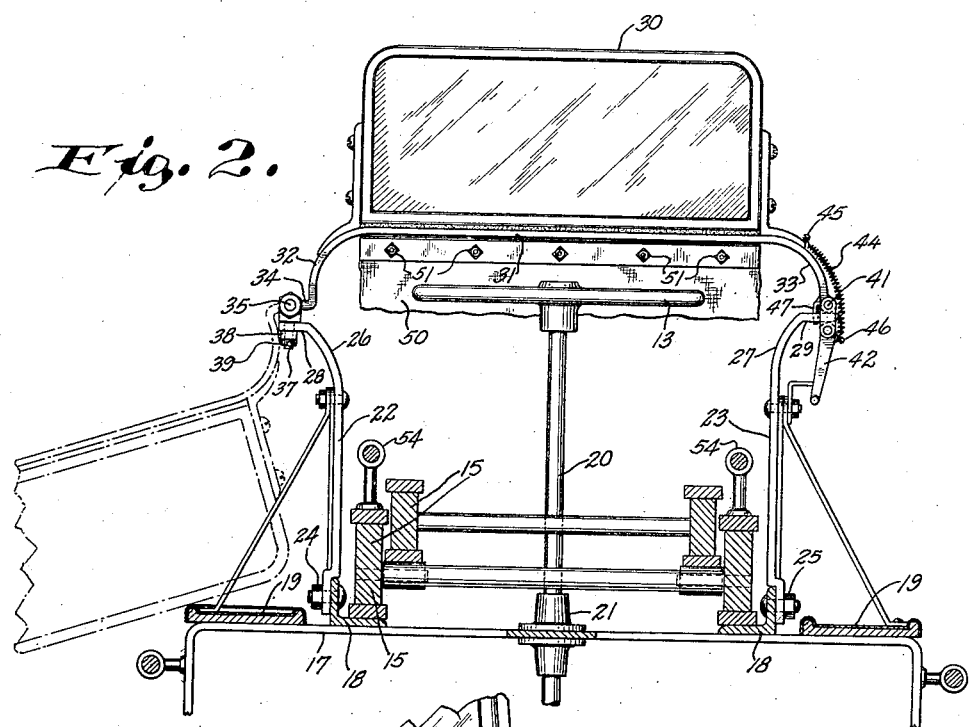
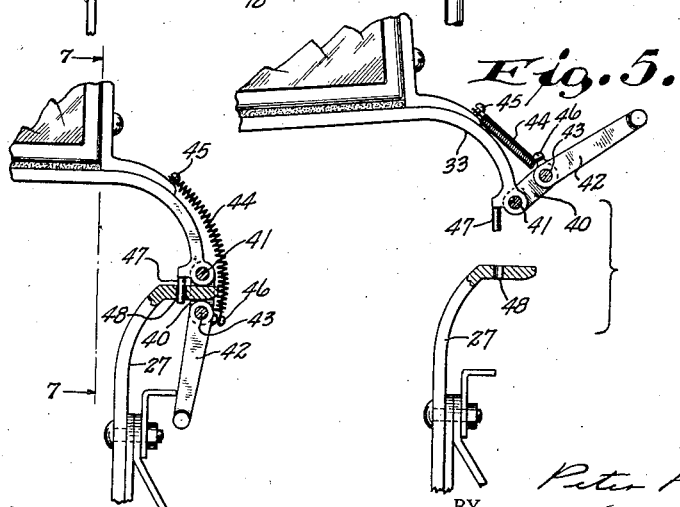
INVENTOR.
Peter Pirsch
BY
Morsell, Lieber & Morsell
ATTORNEYS

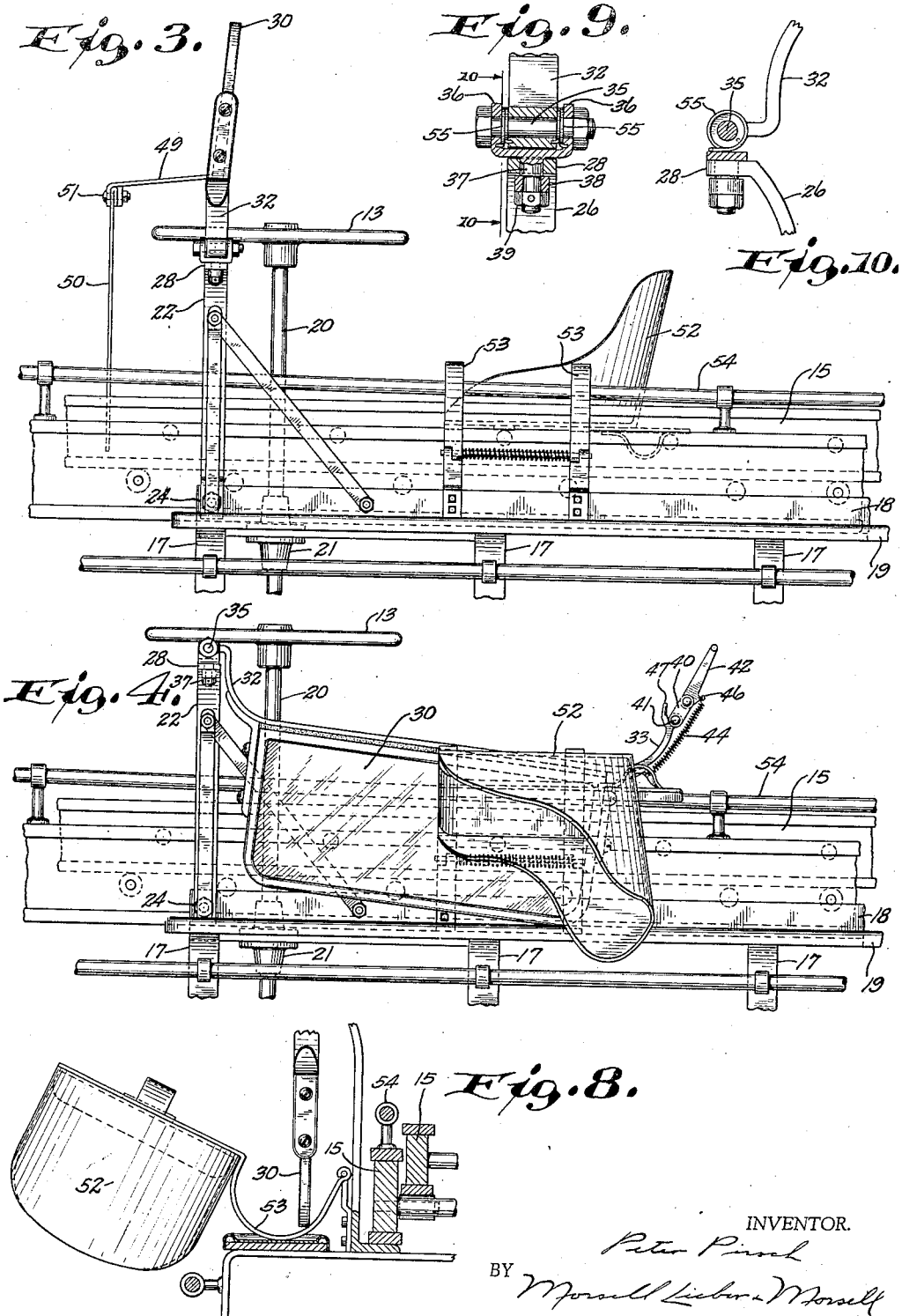

Patented Nov. 23, 1937

2,099,905

UNITED STATES PATENT OFFICE 2,099,905

TILLERMAN'S WINDSHIELD FOR LADDER TRUCK TRAILERS

Peter Pirsch, Kenosha, Wis., assignor to Peter Pirsch and Sons Co., Kenosha, Wis., a firm composed of Peter Pirsch, W. R. Pirsch, and Ceila Pirsch Even Application June 10, 1936, Serial No. 84,432

11 Claims. (Cl. 296—85)

This invention relates to improvements in tillermen's windshields for ladder truck trailers.

Large sized aerial ladder trucks are usually provided with relatively long trailers mounted on wheels, which latter must be steered when the truck is turning a corner or turning into a narrow alley. The man whose duty it is to control the trailer wheels is usually termed a tillerman. Heretofore, the tillerman's seat and windshield have been mounted on vertical posts so as to be swingable from a driving position over the ladders to a lateral position clear of the ladders where they will not interfere with the manipulation thereof. With the type of swingable mounting heretofore employed, both the seat and windshield have been perched at a precarious height and this height remained the same regardless of whether these fixtures were over the ladders or swung laterally. Due to present day speeds, many tillermen have been dislodged from their seats and killed or injured. This usually occurs when one of the trailer wheels hits a curb or rut, or when a tire blows out. The high position is also hazardous because of the fact that in passing through low doorways, under low bridges, or under projecting limbs of trees there is danger of the tillerman being knocked off, or of the windshield being struck or broken with resulting injury to the tillerman.

Heretofore, when the truck arrived at a fire, the tillerman merely swung his windshield and seat laterally on the vertical support so that the aerial ladder could be elevated and the other ladders withdrawn from the truck. Because of the high position in which the windshield and seat were left, they were very much in the way, and the windshield was frequently broken in removing the ladders or was struck during the rotating of the rotary ladder on its turn-table.

The present invention relates more particularly to the windshield and it is a principal object to provide a novel support and mounting which is arranged to support the windshield in a substantially lower position than is standard practice and which is also arranged to provide for swinging of the windshield to a position wherein it is still lower and entirely out of interfering position with respect to the ladders.

A more specific object of the invention is to provide a windshield, one side of which is mounted on a universal joint to provide first, for swinging movement in a vertical plane to a lowered inverted position, and then for swinging movement in a horizontal plane to a position substantially parallel to the longitudinal axis of the trailer.

A further object of the invention is to provide novel means for removably locking the windshield in driving position.

A still further object of the invention is to provide means for shielding the space beneath the windshield to protect the tillerman from the wind.

With the above and other objects in view, the invention consists of the improved tillerman's windshield and all of its parts and combinations as set forth in the claims and all equivalents thereof.

In the accompanying drawings illustrating one complete embodiment of the preferred form of the invention, in which the same reference numerals designate the same parts in all of the views;

Fig. 1 is a side elevational view of an aerial ladder truck showing the improved tillerman's windshield in driving position;

Fig. 2 is a vertical sectional view through a portion of the truck trailer showing the windshield in elevation, looking at the inside thereof, the dot-and-dash lines indicating a position of swinging movement of the windshield;

Fig. 3 is a side elevational view showing a fragment of the trailer with the tillerman's windshield and seat in operative position;

Fig. 4 is a similar view showing the windshield and seat swung to inoperative position to permit access to the ladders;

Fig. 5 is a fragmentary elevational view of the windshield locking mechanism showing the cooperating locking members in slightly separated position;

Fig. 6 is a similar view showing the final locking position of the parts;

Fig. 7 is a fragmentary sectional view taken on the line 7—7 of Fig. 6;

Fig. 8 is a transverse sectional view through a fragment of the truck trailer showing a rear view of the seat in inoperative position and showing how the windshield cooperates with the position of the seat;

Fig. 9 is a fragmentary detail view of the universal joint for the windshield, parts being broken away and shown in section; and Fig. 10 is a fragmentary sectional view taken on line 10—10 of Fig. 9.

Referring more particularly to the drawings, the numeral 10 designates the usual truck having a trailer 11 in connection therewith, said trailer having wheels 12 adapted to be steered in the usual manner by a removable steering wheel 13. The ladder truck may be provided with the usual turn-table 14 and associated mechanism for swinging and elevating an aerial ladder 15. Other ladders 16 may be removably mounted on the trailer beneath the aerial ladder.

Suitable U-shaped metal straps 17 forming a portion of the framework of the trailer form a support for longitudinally extending angle bars 18 which angle bars are spaced apart in the manner shown in Fig. 2, to form a guide and support for the aerial ladder 15. Also carried by said metal straps, on each side of the aerial ladder, are cat walks 19. The steering wheel 13 is adapted to have its shaft 20 removably insertable in a connection member 21 in the usual manner to effect a steering connection with the rear wheels 12.

Vertical supporting posts 22 and 23 are bolted as at 24 and 25 to the angle members 18. The upper ends of said posts are preferably curved outwardly as at 26 and 27, and the extreme upper ends are bent to extend substantially horizontally as at 28 and 29. The windshield 30 is secured to a lower bar 31 which bar has its extremities curved outwardly and downwardly as at 32 and 33. The curved extremity 32 is further bent horizontally as at 34. Said portion 34 is apertured and a pin 35 passing through said aperture and through cooperating apertures in spaced ears 36, of a universal joint, connects the windshield arm 32 to said universal joint. The universal joint is further formed with a depending stud 37 which projects rotatably through an aperture in the horizontal extremity 28 of the vertical post 22. On the projecting end of the stud 37 there may be a collar 38 held in place by a lock nut 39. This construction permits swinging of the windshield 30 from the full line position of Fig. 2 to the dot-and-dash line position therein, this swinging movement being on the pin 35. The construction also provides for additional swinging movement on the stud 37 from the dot-and-dash line position of Fig. 2 to the position shown in Fig. 4.

The extremity 33 of the windshield supporting bar 31 has links 40 pivotally connected thereto as at 41. A lever 42 is in turn pivotally connected to the outer end of the links as at 43. A coil spring 44 has one end connected to the curved arm 33 as at 45 and has its other end connected to the inner end of the lever 42 as at 46. The windshield arm 33 is also provided with a depending pin 47 which is adapted to cooperate with an aperture 48 in the horizontal flange 29 of the supporting post 27. To lock the windshield in driving position, the corner shown in Fig. 5 is swung down as indicated until the pin 47 enters the aperture 48 as shown in Fig. 6. Next, the lever 42 is pushed downwardly to the position of Fig. 6 and when said lever is moved past center, the spring 44 will aid in holding it in locking position. To release the movable end of the windshield, it is merely necessary to pull up on the lever 42 and the spring 44 will aid in this movement as soon as the lever 42 has been moved outwardly past center.

In order to further add to the comfort of the tillerman, a hood 49 of sheet metal or other suitable material may be connected to the lower portion of the windshield frame to project forwardly therefrom in the manner shown in Fig. 3, and a shield 50 of leather, canvas, rubber, or other suitable material may be suspended from the free edge of the hood 49 as at 51. This hood and shield will serve to effectively protect the tillerman from the wind.

The tillerman's seat 52 forms the subject matter of another application. This seat is swingably mounted on U-shaped arms 53, which have one end pivoted to the trailer framework and which have the other end curving over and around the side bars of the aerial ladder 15, as shown in Fig. 1, so that the seat when in operative position, is supported directly on the ladder rungs in the lowest possible position, and in a position substantially below the side rails 54 of the aerial ladder. When it is desired to operate the aerial ladder or to remove other ladders, the seat 52 is swingable on said U-shaped arms 53 from the position shown in Fig. 1 to an inverted, out-of-the-way position as shown in Fig. 4, and it is to be noted by referring to Fig. 4 that the windshield, after it has been swung horizontally on the stud 37, fits nicely within the inverted U-shaped supporting arms 53 of the seat so that both the seat and windshield are in a relatively low out-of-the-way position so as not to interfere with the manipulation of the ladders.

Heretofore, the one side of the windshield was usually connected to a supporting post so as to be swingable thereon. However, when so swung, its height was the same as when it was in driving position. Therefore, it was difficult to prevent breaking the windshield while removing the ladders and while operating the aerial ladder. In the present invention, due to the novel type of universal mounting, and due to the use of the curved arms 32 and 33, the windshield is first swung to an inverted position as shown in Fig. 2, wherein it is very much lower than its driving position. It is further apparent that the windshield is further swingable to a position parallel to the longitudinal axis of the trailer.

If desired, springs 55 may be coiled around the pivots 36 and 37 to aid the tillerman in swinging the windshield from operative to inoperative position.

Although only one form of the invention has been shown and described, it is obvious that various changes and modifications may be made without departing from the spirit of the invention, and all of such changes are contemplated as may come within the scope of the claims.

What I claim is:—

1. A vehicle windshield assemblage comprising supporting means, a windshield, a pivot disposed horizontally at one side of the windshield for hingedly connecting said windshield to the supporting means, said pivot extending at right angles to the plane of the windshield when the latter is in operative position to provide for lateral swinging movement of the winshield in a substantially vertical plane directly from operating position to an inverted inoperative position, and means for releasably locking the other side of the windshield in operative position.

2. A vehicle windshield assemblage comprising supporting means, a windshield, means at one side of the windshield for hingedly connecting said windshield to the supporting means to provide for lateral swinging movement of the windshield to an inverted inoperative position, and yielding means cooperable with said hinged means to aid in swinging the windshield to said inoperative position.

3. A vehicle windshield assemblage comprising supporting means, a windshield, a bent arm projecting laterally and downwardly from one side edge of said windshield, means for hingedly connecting said arm to the supporting means to provide for lateral swinging movement of the windshield to an inverted inoperative position, and means for supporting the opposite side edge of the windshield when the latter is in operative position.

4. A vehicle windshield assemblage comprising a supporting post having a laterally bent upper end, a windshield, a bent arm projecting laterally and downwardly from one edge of said windshield, means for hingedly connecting said arm to the laterally bent upper end of the supporting post to provide for lateral swinging movement of the windshield to an inverted inoperative position, and means for supporting the opposite side edge of the windshield when the latter is in operative position.

5. A vehicle windshield assemblage comprising a supporting post projecting upwardly from the vehicle on one side thereof and having a laterally bent upper end, a supporting post projecting upwardly from the other side of the vehicle and having a laterally bent upper end, a windshield having a laterally and downwardly bent arm at each lower corner thereof, means for hingedly connecting one of said windshield arms to one of the supporting posts to provide for lateral swinging movement of the windshield to an inverted inoperative position, and means for releasably locking the other arm of the windshield to the other supporting post.

6. A tillerman's windshield assemblage for a fire truck trailer having a group of ladders extending longitudinally thereof comprising supporting means on one side of the ladders, a windshield, means at one side of the windshield for hingedly connecting said windshield to the supporting means to provide for lateral swinging movement of the windshield to an inverted position clear of the ladders, and means on the other side of the ladders for supporting the corresponding side of the windshield when the windshield is in operative position so that said windshield spans the ladders.

7. A tillerman's windshield assemblage for a fire truck trailer having a group of ladders extending longitudinally thereof comprising supporting means on one side of the ladders, a windshield, means at one side of the windshield including a universal joint for hingedly connecting said windshield to the supporting means to provide for swinging movement of the windshield in both vertical and horizontal planes so that said windshield may be moved to an inverted position parallel to and clear of the ladders, and means on the other side of the ladders for supporting the corresponding side of the windshield when the windshield is in operative position so that said windshield spans the ladders.

8. A tillerman's windshield assemblage for a fire truck trailer having a group of ladders extending longitudinally thereof and having a steering wheel projecting above said ladders comprising a windshield, means for movably supporting said windshield in a position transversely of and spaced above said ladders, said windshield also being above the steering wheel with a portion of the latter projecting frowardly beneath the windshield, a rigid hood projecting forwardly from the lower edge of the windshield to a point in advance of the forwardmost portion of the steering wheel, and an apron suspended from the forward edge of said hood.

9. A vehicle windshield assemblage comprising supporting means at each side of the vehicle, a windshield, means for hingedly connecting one side edge of the windshield to said supporting means on one side of the vehicle to provide for swinging movement of the windshield in a vertical plane to an inverted inoperative position, an arm depending from the other side edge of the windshield having a latch member, a cooperating latch member on the supporting means on said other side, and a lever for releasably locking said latch members in engaging position.

10. A vehicle windshield assemblage comprising supporting means at each side of the vehicle, a windshield, means for hingedly connecting one side edge of the windshield to said supporting means on one side of the vehicle to provide for swinging movement of the windshield in a vertical plane to an inverted inoperative position, an arm depending from the other side edge of the windshield having a latch member, a cooperating latch member on the supporting means on said other side, a lever for releasably locking said latch members in engaging position, and spring means for maintaining said lever in locking position and for aiding in the release thereof.

11. A vehicle windshield assemblage comprising supporting means, a windshield, a pivot disposed horizontally at one side of the windshield for hingedly connecting said windshield to the supporting means, said pivot extending at right angles to the plane of the windshield when the latter is in operative position to provide for lateral swinging movement of the windshield to an inverted inoperative position, and means engageable with the other side of the windshield for supporting the same in operative position.

PETER PIRSCH.